(No Model.) 2 Sheets—Sheet 1.

G. E. WARING, Jr.
SEWERING AND DRAINING TOWNS.

No. 278,839. Patented June 5, 1883.

Witnesses:

Inventor:

(No Model.) 2 Sheets—Sheet 2.

G. E. WARING, Jr.
SEWERING AND DRAINING TOWNS.

No. 278,839. Patented June 5, 1883.

Witnesses:

Inventor:

UNITED STATES PATENT OFFICE.

GEORGE E. WARING, JR., OF NEWPORT, RHODE ISLAND, ASSIGNOR TO THE DRAINAGE CONSTRUCTION COMPANY, OF BOSTON, MASSACHUSETTS.

SEWERING AND DRAINING TOWNS.

SPECIFICATION forming part of Letters Patent No. 278,839, dated June 5, 1883.

Application filed June 7, 1882. (No model.)

*To all whom it may concern:*

Be it known that I, GEO. E. WARING, Jr., of Newport, in the county of Newport and State of Rhode Island, have invented a new and useful Improvement in Sewering and Draining Towns; and I do hereby declare that the following specification, taken in connection with the drawings, making a part of the same, is a full, clear, and exact description thereof.

The improvement hereinafter described has reference to and is predicated upon the improvement in sewering and draining cities set forth in the Letters Patent No. 236,740, dated January 18, 1881, heretofore granted to me, and to which reference may be had.

The object of the present improvement is to simplify the system described in said patent without lessening the efficiency of the system. In the said system described in my former patent referred to, as in the present improvement upon that system, storm-water is excluded from the sewerage-pipes; but it was in said former system contemplated to use in connection with the sewers special air-inlets opening at the surface of the street, and, also, it was required to have the house soil-pipes extend through to the house-top and be without traps to cut off their direct connection with the street-pipes.

I have ascertained from experiment that while it is in many cases desirable that a system of sewerage such as I have devised should be provided with special air-inlets to ventilate the sewers, in other cases it works a disadvantage, and is liable in localities where heavy rains prevail to admit so much street-water to the sewers as to gorge them and cause backflow into the houses connected with the sewers. I have also ascertained from experiment that while it is desirable and proper that the house-connections with the sewer should extend through to the house-top without traps between the house and the sewer, it is not indispensably necessary for the practical and efficient working of my system of sewering that the house-connections should extend through the roof of the house, nor that trap-connections between the house-pipes and the street-sewer be omitted. In cases where the sewers are connected with untrapped drains and open soil-pipes of houses, such soil-pipes are necessarily of different heights, due to the different heights of the houses and of their locations, and this leads to a difference of barometric pressure, because the soil-pipes projecting through the roofs of the houses are differently exposed to the influence of different winds. For instance, the influence upon a soil-pipe passing through a roof having a southern exposure under a north wind would be different from that upon a soil-pipe passing through a roof having a northern exposure under the same wind. Besides, too, soil-pipes in a house are exposed to different temperatures, according to their location in the house and the temperature in the rooms in the neighborhood of which they pass. Consequently there will be upward or downward drafts through the different soil-pipes, according to circumstances, and a circulation of air will be thereby induced through the sewers. Furthermore, the discharge of water from bathtubs, water-closets, &c., induces a downward movement of air through the soil-pipe and into the sewer, and these influences vary in force with all the varying conditions under which the water conveniences are located and used. The movement of sewage through the sewer itself causes a forward movement of the air contained in it. This favors the general ventilation. Upon the discharge of the flush-tanks, the use of which my system embraces, their contents are delivered into the upper end of the sewer with which such tanks are connected, and flow through with a wave of much force, which, as it advances, drives forward the air in the pipes before it, and this air finds vent through the house-drains and open soil-pipes as the connections of the different houses are reached successively. As the wave passes such connections it causes a partial vacuum behind it, which is supplied by an indraft of air through the house-connections. These combined influences are sufficient to render special openings for the admission of air at the surfaces of the streets unnecessary, and by omitting them the danger of gorging the sewers from storm-water is removed.

In cases where an open soil-pipe is not carried through the roof of the house, and where the house-drain is separated from the sewer by an intervening trap, the influence of the volume of water discharged from the flush-tanks and flowing through the sewer-pipes is so great that a very effective ventilation of the sewer is secured, for the reason that an ordinary house-trap affords so little resistance to air-pressure that in the absence of an open ventilated soil-pipe passing through the roof the water in the traps will yield and permit the passage of air through the traps by the process known as the "siphonage of traps," and consequently there will be a considerable amount of air which will be sucked into the house-pipes through the bowl and closet-traps where there is a system of small sewers copiously flushed by flush-tanks at the heads of the branches, as contemplated by my system.

In the accompanying drawings, Figure 1 shows the plan of arrangement of sewers laid according to my improved system, in which the branches unite consecutively and deliver into a main sewer, a draining-tile being laid in the trench at the side of the sewer and flush-tanks being placed at the upper ends of the branches. *a a a* are blocks between streets. *b b b* are streets. *d d d* are contour lines, or lines of equal elevation. *g g g* are main and collecting sewers. *h h h* are branch sewers. *i i i* are flush-tanks at the upper ends of the branch sewers. The dotted lines *k k k* indicate the position of subsoil-drains, which may deliver into the sewer or to independent outlets.

Figure 1:
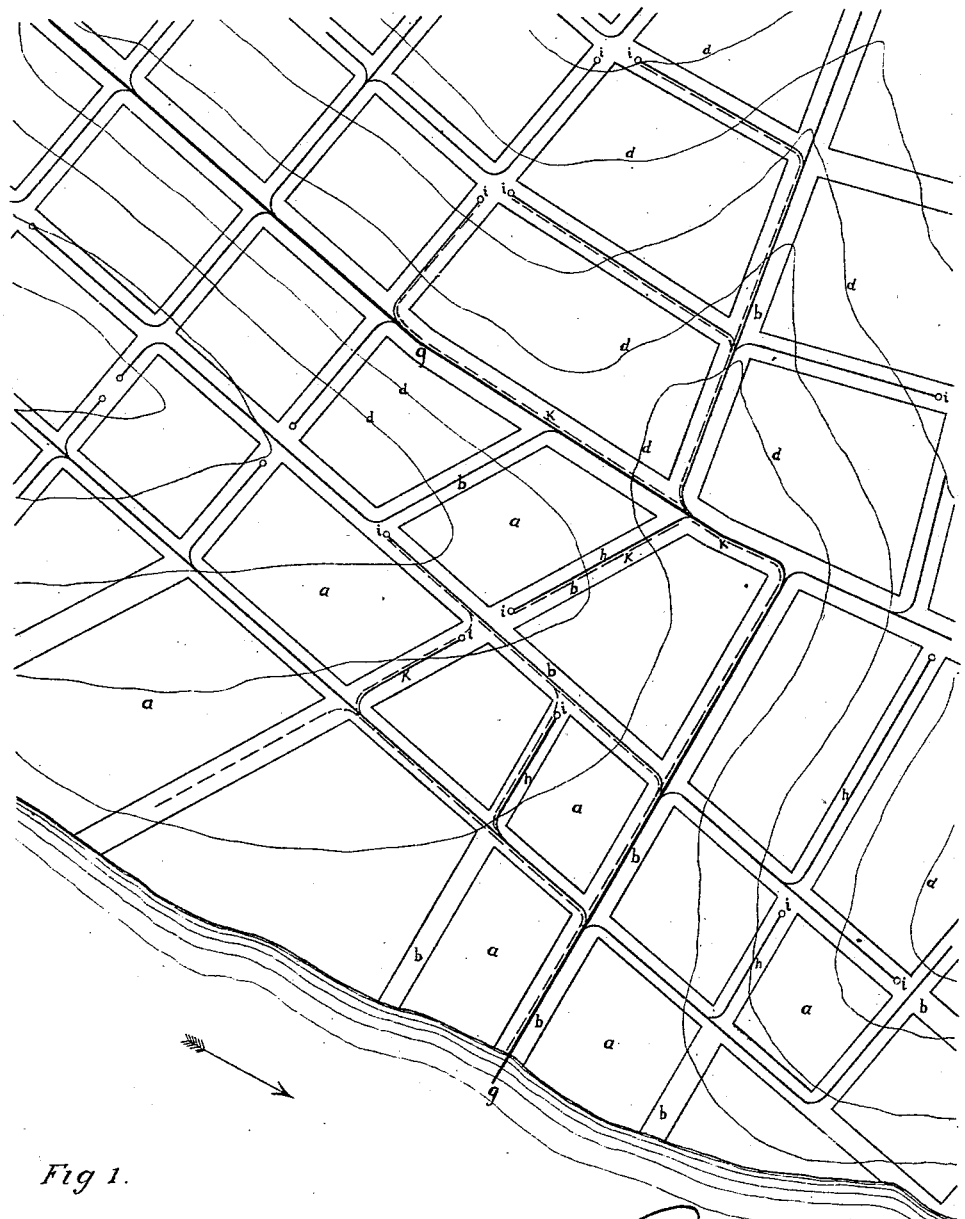
Figure 3:
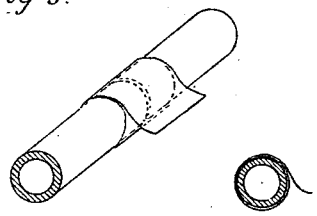
Fig. 3 shows the manner of connecting two drain-tiles with a collar of muslin or similar fabric.
Figure 2:
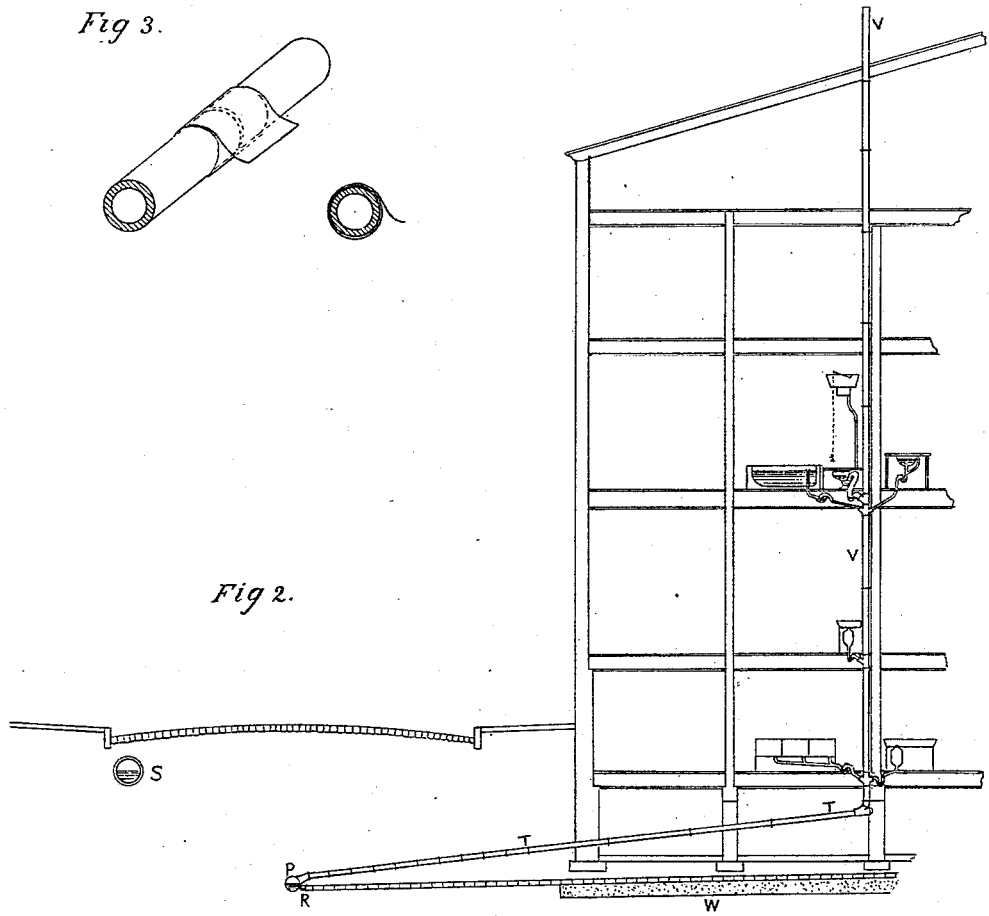
Fig. 2 is a vertical cross-section, showing the position of the sewer P and subsoil-drain R and the connection of these with the house-drain T and soil-pipe V and with the subsoil-drain W of the private property. S indicates a storm-water sewer immediately under the surface of the street and connected with the street-gutter.

While my system comprehends the exclusion of storm-water from the sewer-pipes, it is to be understood that I mean by the statement that storm-water is to be excluded that the system of pipes is not to be constructed as a whole with reference to taking care of storm-water draining from the streets or from the roofs of houses, and although in individual cases the connection of a rain-water leader with the sewer by a householder may be made, or an occasional instance of the connection of a street-culvert with the sewer may occur, the same would not change the character of my system.

While my system comprehends the exclusion of storm-water from the sewers, and is not adapted to receive such water from any large proportion of street or roof surface, it will not be injured or rendered inoperative by the fact that the authorities of the town may fail to enforce the rule of complete exclusion, so that, for instance, a householder may surreptitiously connect a roof-leader with a soil-pipe.

It will be observed that the system exhibited in the drawings is substantially the same as that exhibited in my said former Patent No. 236,740 so far as the general arrrangement of the main or collecting sewers and the branch sewers and the location and combination of the flush-tanks with the upper ends of the branch sewers are concerned; and although there is also exhibited an open soil-pipe extending through the roof of the house, and an untrapped connection between such soil-pipe and the street-sewers, the improvement comprehends a combination of means constituting a system for sewering and draining in which such open-ended soil-pipes extending through the roof are omitted, and in which traps in the connections between the house-pipes and the sewer-pipes are interposed, and embraces, broadly, the combination, with a system of branch and main sewage-pipes from which storm-water is excluded, of automatic flush-tanks for periodically cleansing the sewers, although the house soil-pipes do not extend through the roof into the outer air, and although the house-pipes are trapped, and although there be no special air-inlets at the street-surface communicating with the sewers.

There is also included in this system the combination, with the sewer when it is laid through wet ground, of a porous subsoil-drain made of drainage-tiles with permeable joints, substantially as shown in my said former patent; but the improvement herein exhibited is the method of protecting the joints against the admission of earth by wrapping them with a woven or felted fabric.

In my former patent the joint is protected by a strip of paper wrapped around the pipe at the joint. A better result may be obtained by wrapping around the joint a piece of muslin or similar fabric, which is much stronger and more durable than paper. In process of time this cloth decays, but before it does so the earth about the tile becomes consolidated. The complete drainage of the ground relieves it of the pressure of water which would cause a strong flow into the joint, and by the time the protection afforded by the cloth has ceased to be effective the process of drainage is carried on by a slow rising of the ground-water into the frequent joints of the drain from the bottom in such manner as to carry no earth with it. Unless the joints are thus protected when the pipes are first laid, very small openings into the drain lead to the admission of silt during and immediately after construction to such an extent as frequently to close the drain entirely.

Having thus described my improvement, what I claim, and desire to secure by Letters Patent, is—

1. The improved system of sewerage, substantially as herein described, the same consisting in sewers for the removal of sewage matter, constructed so as to exclude storm-water, in combination with automatic flush-tanks connected with the branches for periodically cleansing the sewers and for inducing ventilating-currents through the pipes and house-connections, omitting or including fresh-air inlets and untrapped house-drains, either or both.

2. The improved joint for drain-pipes, the same consisting in a strip of muslin or similar material wrapped around the joint, as described.

GEO. E. WARING, JR.

Witnesses:
HARRY TIFFANY,
CHAS. A. NEFF.